US009055486B2

(12) United States Patent
Farhadi (10) Patent No.: US 9,055,486 B2
(45) Date of Patent: Jun. 9, 2015

(54) SYSTEMS AND METHODS FOR COEXISTENCE MANAGEMENT OF SHARED SPECTRUM ACCESS

(71) Applicant: Fujitsu Limited, Kanagawa (JP)

(72) Inventor: Golnaz Farhadi, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 65 days.

(21) Appl. No.: 13/736,845

(22) Filed: Jan. 8, 2013

(65) Prior Publication Data
US 2014/0128088 A1 May 8, 2014

Related U.S. Application Data

(60) Provisional application No. 61/721,875, filed on Nov. 2, 2012.

(51) Int. Cl.
| | |
|---|---|
| H04W 72/00 | (2009.01) |
| H04B 7/00 | (2006.01) |
| H04W 4/00 | (2009.01) |
| H04W 36/00 | (2009.01) |
| H04W 72/04 | (2009.01) |
| H04W 16/14 | (2009.01) |

(52) U.S. Cl.
CPC .......... *H04W 36/00* (2013.01); *H04W 72/0486* (2013.01); *H04W 16/14* (2013.01)

(58) Field of Classification Search
CPC ... H04W 4/02; H04W 72/1215; H04W 28/18; H04W 72/0486
USPC ................ 455/452.1, 509, 453; 370/328, 329
See application file for complete search history.

(56) References Cited

U.S. PATENT DOCUMENTS

| | | | |
|---|---|---|---|
| 2009/0238090 | A1 | 9/2009 | Sambhwani et al. |
| 2010/0248739 | A1* | 9/2010 | Westerberg et al. .......... 455/453 |
| 2011/0250916 | A1* | 10/2011 | Li et al. ......................... 455/509 |
| 2011/0310866 | A1 | 12/2011 | Kennedy et al. |
| 2012/0230250 | A1* | 9/2012 | Kasslin et al. ................ 370/328 |

FOREIGN PATENT DOCUMENTS

WO    WO 2008/088254    7/2008    ............ H04Q 7/36

OTHER PUBLICATIONS

IEEE; "P802.19.1 /DF3.02, Draft STandard for TV White Space Coexistence Methods"; pp. 250.
Federal Communications Commision; "Second Memorandum Opinion and Order"; pp. 100.
Mahonen et al.; "Automatic Channel Allocation for Small Wireless Local Area Networks Using Graph Colouring Algorithm Approach"; IEEE 802.11; pp. 536-539.

(Continued)

*Primary Examiner* — William Nealon
(74) *Attorney, Agent, or Firm* — Baker Botts L.L.P.

(57) ABSTRACT

Systems and methods for managing coexistence between a plurality of radio networks configured to operate over a shared spectrum are disclosed. These may include gathering a plurality of data about each of the plurality of radio networks; determining a load level associated with each of the plurality of radio networks; determining a bandwidth allocation value, the bandwidth allocation value based at least on the load level; and allocating a plurality of channel slices among the plurality of radio networks.

21 Claims, 4 Drawing Sheets

(56) References Cited

OTHER PUBLICATIONS

Song et al.; "Chapter 2: On the Spectrum Handoff for Cognitive Radio Ad Hoc Networks Without Common Control Channel"; Cognitive Radio Ad Hoc Networks; pp. 37-74.

Yoon et al.; "Voluntary Spectrum Handoff: A Novel Approach to Spectrum Management in CRNs"; IEEE ICC 2010 proceedings; pp. 5.

Chen et al.; "A Relay-Assisted Protocol for Spectrum Mobility and Handover in Cognitive LTE Networks"; IEEE Systems Journal, vol. X, No. X; pp. 12.

Zhang; "Spectrum Handoff in Cognitive Radio Networks: Opportunistic and Negotiated Situations"; IEEE ICC 2009 proceedings; pp. 6.

Lertsinsrubtavee et al.; "Spectrum Handoff Strategies for Mutiple Channels Cognitive Radio Network"; ACM CoNEXT 2010; pp. 2.

Moscibroda et al.; "Load-Aware Spectrum Distribution in Wireless LANs"; IEEE 802.11; pp. 10.

Chieochan et al.; "Channel Assignment Schemes for Infrastructure-Based 802.11 WLANs: A Survey"; IEEE Communications Surveys & Tutorials; vol. 12, No. 1; pp. 124-136.

International Search Report and Written Opinion; PCT/US2013/063989; pp. 12.

International Search Report and Written Opinion; PCT/US2013/067097; pp. 13.

Kumar et al.; "Spectrum Sharing for Next Generation Wireless Communication Networks"; Cognitive Radio and Advanced Spectrum Management; First International Workshop on; IEEE; XP031247475; pp. 4.

Non-Final Office Action, U.S. Appl. No. 13/736,855, 6 pages.

\* cited by examiner

SYSTEMS AND METHODS FOR COEXISTENCE MANAGEMENT OF SHARED SPECTRUM ACCESS

RELATED APPLICATION

This application claims benefit under 35 U.S.C. §119(3) of U.S. Provisional Ser. No. 61/721,875, entitled "SYSTEMS AND METHODS FOR COEXISTENCE MANAGEMENT OF SPECTRUM ACCESS," filed Nov. 2, 2012, the entire content of which is incorporated herein by reference.

TECHNICAL FIELD

The present invention relates generally to communication networks and, more particularly, to systems and methods for coexistence management of shared spectrum access.

BACKGROUND

As the number and types of radio networks proliferate, and the amount of communication carried thereon increases, it has become increasingly important to manage networks comprising radio networks of differing radio access technologies, power limitations, frequency limitations, and other differences. These heterogeneous networks may become increasingly complicated over white space bands that are shared among these networks. While some solutions have been offered for managing coexistence in whitespace bands, there remains problems concerning the maximization of spectrum re-use as well as spectrum utilization while avoiding interference.

SUMMARY OF THE DISCLOSURE

In accordance with certain embodiments of the present disclosure, a management system for managing coexistence between a plurality of radio networks configured to operate over a shared spectrum is disclosed. The management system may include a processor; a neighbor detection engine communicatively coupled to the processor, the neighbor detection engine configured to gather a plurality of data about each of the plurality of radio networks; a load analysis engine communicatively coupled to the processor, the load analysis engine configured to determine a load level associated with each of the plurality of radio networks; a spectrum analysis engine communicatively coupled to the processor, the spectrum analysis engine configured to determine a bandwidth allocation value, the bandwidth allocation value based at least on the load level; and a channel slicing engine communicatively coupled to the processor, the channel slicing engine configured to allocate a plurality of channel slices among the plurality of radio networks.

In accordance with certain embodiments of the present disclosure, a system for managing coexistence between a plurality of radio networks configured to operate over a shared spectrum is disclosed. The system may include a management system and a radio network. The management system may include a processor; a neighbor detection engine communicatively coupled to the processor, the neighbor detection engine configured to gather a plurality of data associated with each of the plurality of radio networks; a load analysis engine communicatively coupled to the processor, the load analysis engine configured to determine a load level associated with each of the plurality of radio networks; and a spectrum analysis engine communicatively coupled to the processor, the spectrum analysis engine configured to determine a bandwidth allocation value, the bandwidth allocation value based at least on the load level. The radio network may be configured to receive the plurality of data associated with each of the plurality of radio networks; receive the bandwidth allocation value; and allocate a plurality of channel slices associated with the radio network.

In accordance with certain embodiments of the present disclosure, a method for managing coexistence between a plurality of radio networks configured to operate over a shared spectrum is disclosed. The method may include gathering a plurality of data about each of the plurality of radio networks; determining a load level associated with each of the plurality of radio networks; determining a bandwidth allocation value, the bandwidth allocation value based at least on the load level; and allocating a plurality of channel slices among the plurality of radio networks.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Preferred embodiments and their advantages are best understood by reference to FIGS. 1 through 5, wherein like numbers are used to indicate like and corresponding parts.

As data traffic growth increases and spectrum becomes increasingly scarce, several solutions have arisen to meet the mobile broadband data demand. One solution may be the deployment of small cells and relays to reuse the licensed spectrum. However, the limited spectrum in the licensed bands may cause too much interference and hence may have poor performance. Similarly, proposals exist to offload some communication over wifi networks. In some cases, this may lead to high congestion in dense areas and issues may arise with, for example, the inherent fixed channelization specified in the IEEE 802.11 technology.

Unlicensed spectra may be available for data communication, including that available within allocated bands when the designated users are not making full use of the allocated spectrum. This unlicensed bandwidth may be generally referred to as "whitespace bands." For example, some additional spectrum has become available in the television ("TV") band and more may be available in the future. When incumbents are not using this band, access is unlicensed and may be used. This spectrum may be referred to generally as the TV white spaces ("TVWS"). Use of whitespace bands however, outlines certain difficulties in managing the coexistence of disparate radio networks in heterogeneous environments. Currently, IEEE 802.19.1 aims at providing a framework to facilitate coexistence management, but this proposal remains in progress.

One purpose of the present disclosure is to allocate spectrum (for example, bandwidth allocation and channel assignments) to each radio network (for example, access points or base stations) sharing the same spectrum band (for example, TV white spaces). Each network may operate based on a different radio access technology (for example, IEEE 802.11 WLAN, IEEE 802.22, or LTE) and may belong to a different operator.

For example, the total amount of spectrum available for shared access (unlicensed/license-exempt) may be denoted by $B_{total}$. This could be a contiguous chunk of spectrum in TV or federal bands or non-contiguous channels in TV or federal bands, and/or some combination of both.

In some embodiments, one goal in spectrum allocation may be to use the white spaces as much as possible while avoiding interference to neighbor networks. In addition, adaptive bandwidth lengths may be allocated to each network proportional to the load requirement of each network. This may provide better utilization of the available unlicensed shared spectrum. In order to support adaptive bandwidth allocation, the entire available spectrum may be divided into slices each of width W Hz.

One method for managing coexistence in a heterogeneous environment may include (1) maximizing spectrum reuse such that as much bandwidth as possible may be allocated to each network, proportional to their load, given the interference constraints; and (2) assigning channel slices based on the bandwidth requirement while avoiding interference to the neighbor networks.

Figure 1:
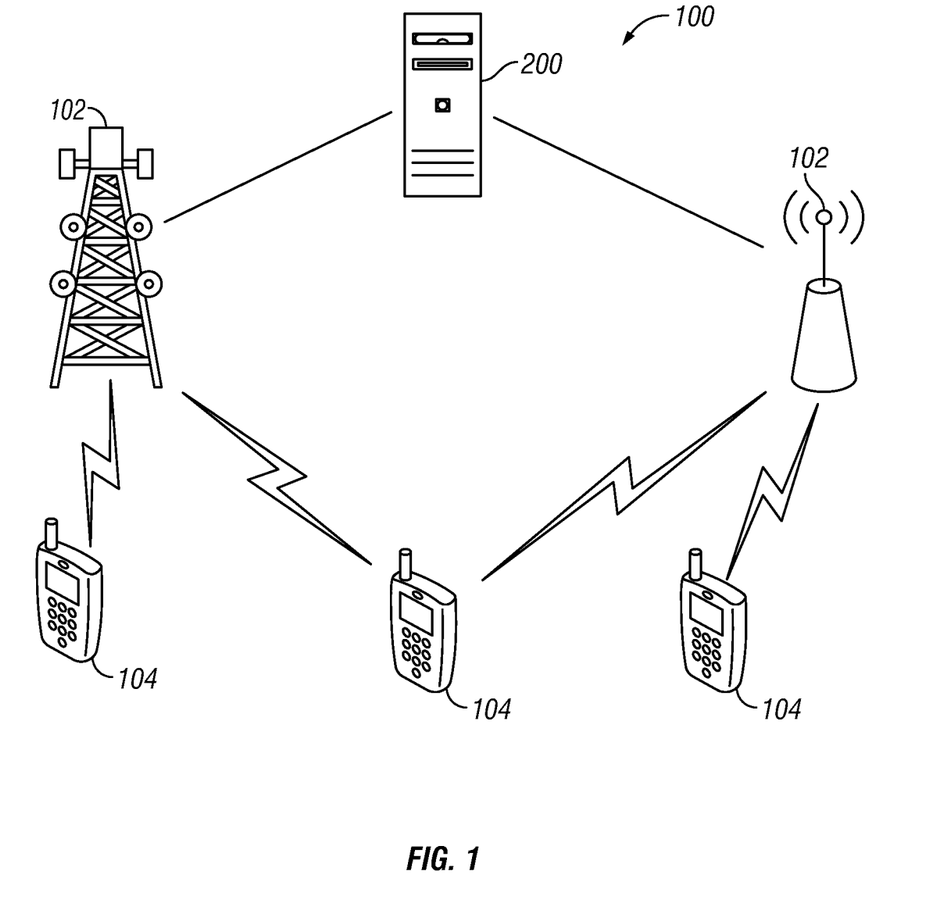
FIG. 1 illustrates an example system for managing coexistence in white spaces, in accordance with certain embodiments of the present disclosure.

FIG. 1 illustrates an example system 100 for managing coexistence in white spaces, in accordance with certain embodiments of the present disclosure. In some embodiments, system 100 may include a plurality of radio networks 102, one or more user equipment(s) 104, and one or more management system(s) 200 communicatively coupled to radio networks 102. As described in more detail below with reference to FIGS. 2-5, management system 200 may be configured to allocate spectrum (e.g., bandwidth allocation and channel assignments) between or among each of the plurality of radio networks 102 sharing the same spectrum band to allow communication by user equipment 104 across radio networks 102. In some embodiments, management system 200 may be further configured to provide data that may facilitate spectrum allocation by each of the plurality of radio networks 102 sharing the same spectrum band.

In some embodiments, radio network 102 may be an access point to a communication network, the access point configured to allow user equipment 102 to communicate over the communication network. In some embodiments, each radio network 102 shares the same spectrum band as other radio networks 102, while potentially operating on a different radio access technology (e.g., IEEE 802.11, IEEE 802.22, LTE, etc.). Further, each radio network 102 may be owned and/or operated by a different operator. For example, system 100 may include four radio networks 102, including two LTE transmission towers, and two 802.22 wireless access points. In the same or alternative configurations, system 100 may include, more, fewer, or different configurations of radio networks 102 without departing from the scope of the present disclosure.

In some embodiments, user equipment 104 may be an electronic device and/or combination of electronic devices configured to communicate and/or facilitate communication over any or all of the radio networks 102. For example, user equipment 104 may be a cellular telephone, tablet computer, laptop computer, network of other user equipment 104, and/or or other appropriate electronic device may be configured to transmit and/or receive data over radio network 102.

In some embodiments, management system 200 may include a number of components configured to allocate spectrum (e.g., bandwidth allocation and channel assignments) between or among each of the plurality of radio networks 102 sharing the same spectrum band to allow communication by user equipment 104 across radio networks 102 and/or provide data that may facilitate spectrum allocation by each of the plurality of radio networks 102 sharing the same spectrum band, as described in more detail below with reference to FIGS. 2-5. As described in more detail below with reference to FIGS. 2-5, management system 200 may include components that may "slice" the total available spectrum to enable adaptive bandwidth allocation between or among a plurality of radio networks 102 in a manner that takes into consideration a load requirement of each radio network 102 as well as interference conditions among radio networks 104 operating different radio access technologies (a "heterogeneous access network").

Management system 200 may be any electronic device or aggregation of electronic devices configured to manage coexistence among neighbor radio networks 102, as described in more detail below with reference to FIGS. 2-5. Although management system 200 is illustrated as a single electronic device, one of ordinary skill in the art would recognize that management system 200 could be a plurality of electronic devices communicatively coupled to one another without departing from the scope of the present disclosure. Further, system 100 may include a plurality of management system 200, as described in more detail below with reference to FIGS. 2-5. For example, some configurations of system 100 may include a plurality of radio networks 102 subscribed to a single management service provided by management system 200 ("centralized service"). Other configurations of system 100 may include a plurality of radio networks 102 managed by a plurality of managements services, provided by a plurality of management systems 200 ("centralized negotiation service"). Still other configurations of system 100 may include a plurality of radio networks that do not subscribe to a centralized management service ("decentralized service").

In operation, there may be a number of access radio networks 102 attempting to access a shared spectrum band within a given area. In such a configuration, it may be necessary or desirable to manage the interference between radio networks 102. For example, in the absence of sufficient coordination among radio networks 102, interference may limit and/or degrade performance of system 100. However, radio networks 102 may be vastly different from one another, including different radio access technologies, power limitations, frequency limitations, etc. As a result, management of spectrum allocation between or among radio networks 102 may result in reduction in interference, more efficient allocation of resources, and better system performance.

Some existing solutions provide for channel assignment in, for example, a wireless local area network ("WLAN") in order to share a 2.4 and/or 5 GHz band. However, such solutions may be limited to allocating one channel to each network with a fixed bandwidth allocation. Other existing solutions provide for channel assignments in a WLAN that may allocate contiguous channels to each access point. However, such solutions may not be readily applicable to a system 100 in which multiple operators control different radio networks 102 and/or a system 100 in which radio networks 102 operate on different radio access protocols. Still other existing solutions provide for management for networks operating over a television white space ("TVWS") band. However, such solutions may not consider adaptive channel assignment to different types of radio networks 102, may not take into consideration the maximization of spectrum allocation in bandwidth allocation, and may not take into consideration spectrum re-use in channel assignment.

Figure 2:
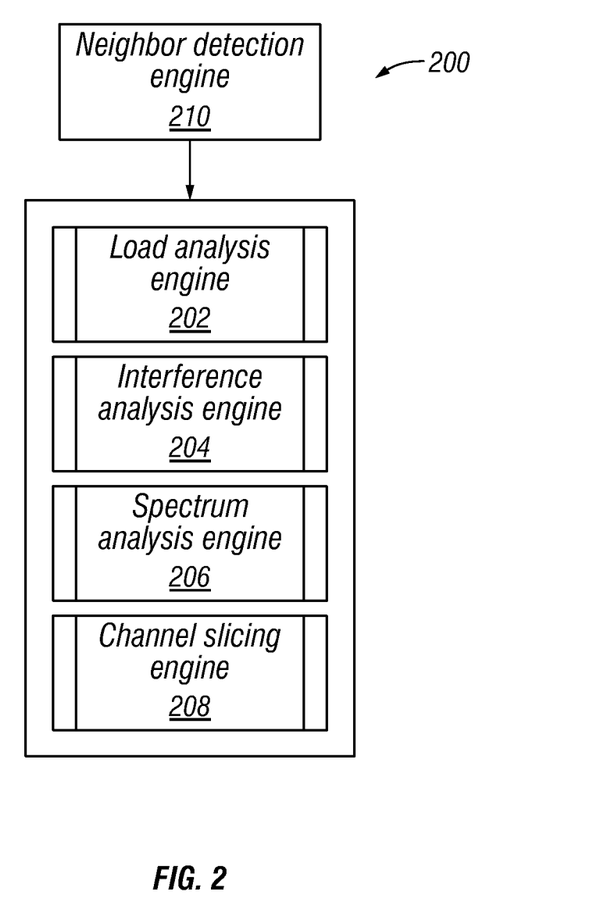
FIG. 2 illustrates an example management system for managing coexistence in white spaces, in accordance with certain embodiments of the present disclosure.

FIG. 2 illustrates an example management system 200 for managing coexistence in white spaces, in accordance with certain embodiments of the present disclosure. In some embodiments, management system 200 may include load analysis engine 202, interference analysis engine 204, spectrum analysis engine 206, channel slicing engine 208, and neighbor detection engine 210.

In some embodiments, load analysis engine 202, interference analysis engine 204, spectrum analysis engine 206, channel slicing engine 208, and neighbor detection engine 210 may be one or more components of management system 200, including software, firmware, and/or hardware modules and/or components. Each may be a stand-alone component, a part of a larger component, and/or may be configured differently than that illustrated in example management system 200 without departing from the scope of the present disclosure. For example, each component may reside on one or more servers communicatively coupled to one another, where the one or more server(s) comprise management system 200. Those servers may be colocated and/or remotely located from one another. As another example, all components may be part of management system 200 and/or some components may be instead be part of one or more user(s) 104 and/or radio networks 102.

In some embodiments, neighbor detection engine 210 may be configured to determine the location, nature, and other requirements of the plurality of radio networks 102 sharing a bandwidth. Within management system 200, neighbor detection engine 210 may be configured to receive, process, aggregate, and/or prepare this data for use by management system 200. For example, neighbor detection engine may gather all relevant data from all radio networks 102 and then make that data available to load analysis engine 202, interference analysis engine 204, spectrum analysis engine 206, and/or channel slicing engine 208.

For example, as described in more detail above with reference to FIG. 1 and below with reference to FIG. 3, each radio network 102 may have distinct requirements (e.g., bandwidth, transmission power, system architecture, permissible device types, etc.). In some configurations of management system 200, there may be a plurality of radio networks 102 employing a common radio access technology (e.g., a plurality of 802.22 access points) as well as one or more radio networks 102 employing a different radio access technology. In such configurations, neighbor detection engine 210 may be configured to access information about radio networks 102 from beacon signals advertised from radio networks 102.

Further, as described in more detail below with reference to FIGS. 3-5, management system 200 may be configured to provide data associated with neighbor radio networks 102 to other radio networks 102. For example, in decentralized environments, management system 200 may provide a report to neighbor radio networks 102 sufficient to allow radio networks 102 to determine bandwidth and channel assignment without making a centralized decision regarding bandwidth and channel assignment. In both centralized and decentralized environments, neighbor detection engine 210 may be configured to gather radio network data in order to make it available to other components of management system 200.

In some embodiments, management system 200 may be configured to be compatible with standards regarding coexistence management. For example, IEEE 802.19.1 provides an example coexistence management architecture wherein a centralized system may acquire information regarding each radio network 102 (e.g., load requirements, access technology, location, etc.). Management system 200 may be configured to provide this information to the plurality of radio networks 102 sharing a common spectrum within system 100. For example, each radio network 102 may subscribed to a service provided by management system 200 wherein management system 200 provides channel assignments within the shared spectrum. As an additional example, management system 200 may provide information that may be associated with channel selection at each radio network 102.

In some embodiments, load analysis engine 202 may be configured to analyze the current load (e.g., available capacity) on each radio network 102 within system 100. Load analysis engine 202 may be configured to assist management system 200 in allocating adaptive bandwidth lengths to each radio network 102 proportional to the load requirement of each radio network 102. For example, load analysis engine 202 may analyze data received at neighbor detection engine 210 as described in more detail above. Load analysis engine 202 may be configured to derive data associated with the load of each radio network of system 100, as described in more detail below with reference to FIGS. 3-5. The load may be the total number of users associated with radio network 102, a sum data rate that radio network 102 is configured to support, or any other appropriate identifier of the network load. Load analysis engine 202 may make this data available to interference analysis engine 204, spectrum analysis engine 206, channel slicing engine 208, and/or neighbor detection engine 210.

In some embodiments, interference analysis engine 204 may be configured to analyze the current level of interference between or among the plurality of radio networks 102. Interference analysis engine 204 may make use of data made available by neighbor detection engine 210 to determine whether a given radio network 102 may be within transmission range of, and/or interfering with, another radio network 102, as described in more detail below with reference to FIGS. 3-8.

After determining the set of radio networks 102 that may share the same spectrum band, interference analysis engine 204 may make data associated with this analysis available to spectrum analysis engine 206, channel slicing engine 208, neighbor detection engine 210, and/or load analysis engine 202 of management system 200.

In some embodiments, spectrum analysis engine 206 may be configured to determine an optimal bandwidth allocation between or among radio networks 102 of system 100, as described in more detail below with reference to FIGS. 3-8. Spectrum analysis engine 206 may make use of data made available by neighbor detection engine 210, load analysis engine 202, and interference analysis engine 204 to determine the optimal bandwidth allocation.

After determining the optimal bandwidth allocation, spectrum analysis engine 206 may make data associated with this analysis available to channel slicing engine 208, neighbor detection engine 210, load analysis engine 202, interference analysis engine, and/or spectrum analysis engine 206 of management system 200.

In some embodiments, channel slicing engine 208 may be configured to allocate the bandwidth of the shared spectrum between or among the various radio networks 102 of system 100, as described in more detail below with reference to FIGS. 3-8. Channel slicing engine 206 may make use of data made available by neighbor detection engine 210, load analysis engine 202, interference analysis engine 204, and/or spectrum analysis engine 206 to allocate the bandwidth.

In some embodiments, channel slicing engine 208 may be configured to allocate bandwidth in a manner that may avoid interference by assigning orthogonal channels to neighbor networks such that the required bandwidth identified by spectrum analysis engine 206 may be achieved, as described in more detail below with reference to FIGS. 3-5.

In operation, management system 200 is configured to provide a centralized repository for data associated with neighbor radio network 102. In addition—as described above and in more detail below with reference to FIGS. 3-5—management system 200 may also be configured to provide centralized coexistence management services to a plurality of radio networks 102. In some embodiments, radio networks 102 may be configured to be centrally serviced by management system 200. For example, all radio networks 102 may be subscribed to one management system 200. In such configurations, management system 200 may signal to each radio network 102 which portion of the spectrum to use, as described in more detail below with reference to FIG. 3. The channel assignment may be either contiguous or non-contiguous.

Figure 3:
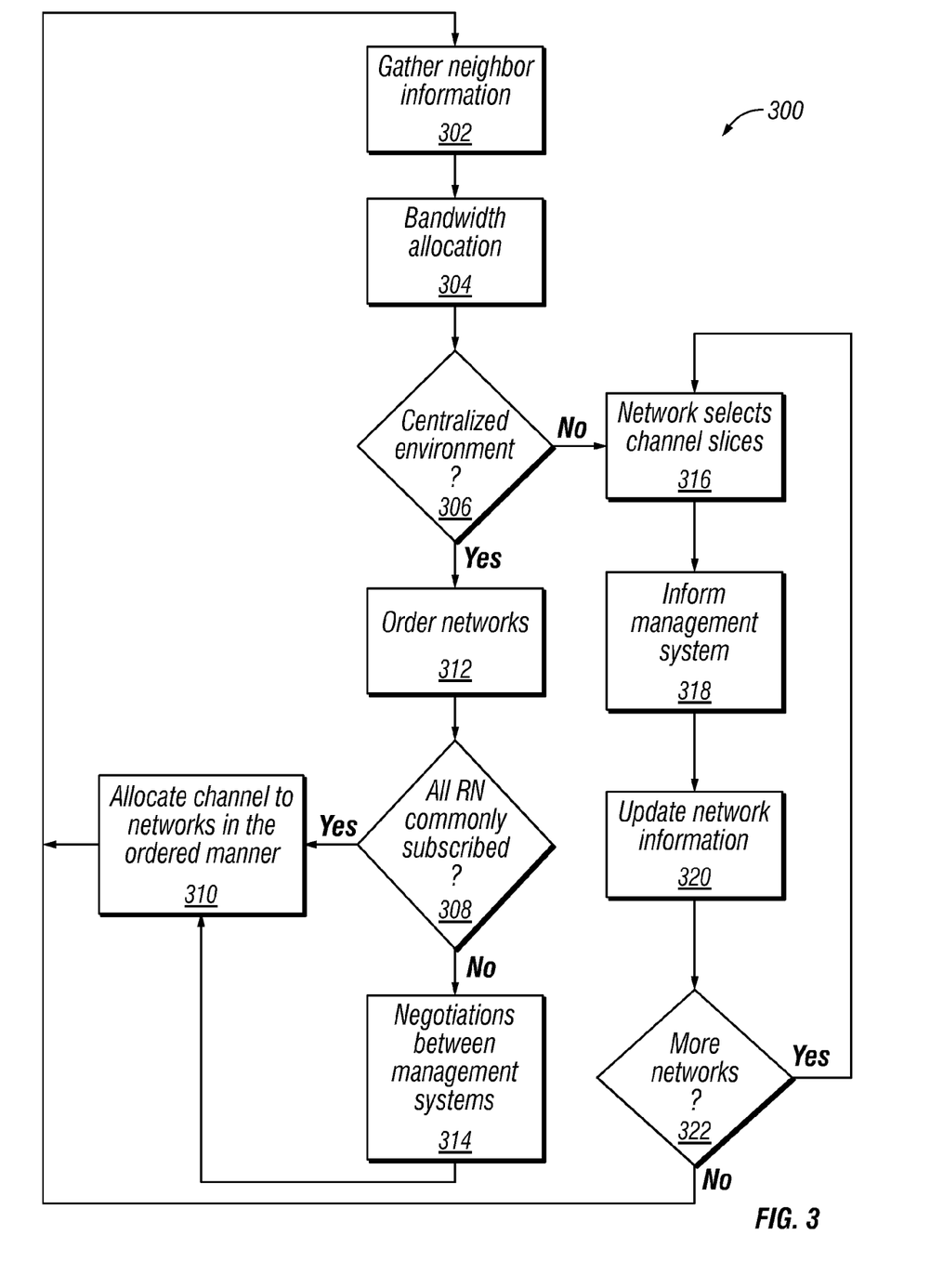
FIG. 3 illustrates a flowchart of an example method for managing coexistence in white spaces, in accordance with certain embodiments of the present disclosure.

FIG. 3 illustrates a flowchart of an example method 300 for managing coexistence in white spaces, in accordance with certain embodiments of the present disclosure. Method 300 may include determining whether a system is centralized, determining whether all radio networks are commonly operated, gathering neighbor network information, allocating bandwidth to the radio networks, and assigning channels.

According to one embodiment, method 300 preferably begins at step 302. Teachings of the present disclosure may be implemented in a variety of configurations. As such, the preferred initialization point for method 300 and the order of steps 302-322 comprising method 300 may depend on the implementation chosen.

At step 302, method 300 may gather information about neighbor radio networks 102, as described in more detail above with reference to FIGS. 1-2 and below with reference to FIGS. 4-5. Information about radio networks 102 may include the type of radio access technology, power limitations, frequency limitations, etc. As described in more detail below with reference to FIG. 4, this data may be aggregated into a report, e.g., a CXReport.

In some configurations, one piece of data that may be gathered is the set of channels that may be reused. In the example formulas provided below, the term "$L_u$" is used to denote the load of network u, where u is one of the plurality of radio networks 102. In the example formulas provided below, "G" denotes an interference graph where the plurality of radio networks 102 may be represented as vertices of the graph. In some configurations, if there is an edge between two radio networks 102, then the two networks may be within interference range of one another. Interference analysis engine 204 may be further configured to analyze the interference data to determine what portion of the spectrum may be reused.

For example, a graph G may represent a number N of radio networks 102 within system 100. $N(u)$ may then be used to denote the set of radio networks 102 interfering with network u of the plurality of radio networks 102 within system 100. $N(u)$ may be split into two subsets: $N_n(u)$ and $\tilde{N}(u)$. $N_n(u)$ may be a subset of radio networks 102 neighboring network u whose allocated channel slices may be reused by some other neighbor networks of u. $\tilde{N}(u)$ may be a subset of radio networks 102 neighboring network u that can reuse the channels allocated to the networks in $N_g(u)$ (the "neighbor reuse subset"). The pseudo-code provided below illustrates one example method for determining the set $\tilde{N}(u)$. In the example provided,

```
for u = 1:N
    v ∈ N(u)
    N̄(u) = φ
    C_u = cardinality (N(u))
        for i = 1, .... C_u − 1
            if v_i ∉ N̄(u)
                for j = i + 1, ..., C_u
                    if E_ij = C
                    {
                        N̄(u) ← v_j
                        N_R(u) ← v_i
                        reusePair ← (v_i, v_j) // the pair of networks that can re-
                                                  use the same channel slices
                    }
                    j = j + 1
                end
            i = i + 1
        end
    u = u + 1
end
```

In some configurations, there may arise a worst-case complexity of the exhaustive search, denoted by $O(N^3)$—polynomial time complexity. Different algorithms may be used to enhance the time complexity. In some configurations of system 100, however, the number of radio networks, N, deployed in a dense urban area is typically less than 100 or 200 per 100×100 m² area. The exhaustive search may therefore be feasible for this density.

After data has been gathered, method 300 may proceed to step 304. At step 304, method 300 may determine an optimal bandwidth allocation between or among radio networks 102 of system 100.

In the example formulas provided below, $P_u$ be used to denote a maximum power that network u may be permitted to transmit over a white space band. This power level may be determined by regulation, for example. $B_u$ may be used to denote the bandwidth allocated to network u, creating a vector $B_u$ where B is equal to $[B_u \ldots, B_N]$. $B_{total}$ may be used to denote the total amount of bandwidth available for system 100.

$$\max_B \sum_{u=1}^{N} B_u \quad \text{FORMULA 1}$$

$$\text{subject to } B_u \geq \alpha f_u(load_u) B_{total}, \forall u \quad \text{FORMULA 2}$$

$$B_u + \sum_{v \in N_R(u)} B_v \leq B_{total}, \forall u \quad \text{FORMULA 3}$$

In some embodiments, spectrum analysis engine 206 may be configured to analyze spectrum data in accordance with FORMULA 1 above. In some configurations, this may serve to maximize the spectrum re-use. In order not to overload a given radio network 102, spectrum analysis engine 206 may be further configured to constrain this allocation via an analysis of FORMULA 2. This constraint may ensure that each radio network 102 gets a "fair share" of spectrum for its load requirement. In some configurations, the constraint is tuned by means of the parameter α. α may be characterized as a tradeoff between fairness between or among radio networks 102 and spectrum utilization. Additionally, the constraint of FORMULA 2 makes use of the formula f(load), described in more detail below with reference to FORMULA 4.

$$f_u(\text{load}) = \frac{L_u}{\left(L_u + \sum_{v \in N_R(u)} (L_v)\right)} \quad \text{FORMULA 4}$$

As described in more detail above with reference to FIGS. 1-2, system 100 may include a plurality of radio networks 102 with different power limits over the spectrum to be shared. For example, a 4-Watt base station may coexist with a 100-mWatt access point. In such configurations, the load function denoted above in FORMULA 4 may be modified to include a power mismatch (e.g., by replacing $L_u$ with $$\frac{L_u}{P_u}).$$

The combination of α and f(load) may be understood collectively as a "bandwidth sharing index," as described in more detail above with reference to FIGS. 1-2.

In some embodiments, there may be a further constraint, as illustrated above with reference to FORMULA 3. This constraint may ensure that the total bandwidth allocated to a given network and its neighbors (that do not belong to the network neighbor reuse subset) does not exceed the total available bandwidth. This constraint may enable orthogonal channel assignment to neighbor networks, potentially avoiding interference. Further, this constraint may increase spectrum utilization by considering for reuse those networks that are not within interfering range of one another.

The bandwidth optimization problem described above with reference to FORMULAS 1-4 delineates a linear programming problem. Varying the parameter α may achieve different tradeoffs between fairness and spectrum utilization. The value of parameter α may also be determined such that the worst node performance is maximized, as illustrated below in FORMULA 5.

$$\max_{\alpha, B} \alpha$$
$$\text{subject to } B_u \geq \alpha f_u(\text{load}_u) B_{\text{total}}, \forall u$$
$$B_u + \sum_{v \in N_R(u)} B_v \leq B_{\text{total}},$$

After determining the optimized bandwidth allocation, method 300 may proceed to step 306. At step 306, method 300 may determine whether the radio networks 102 of system 100 are part of a centralized environment. As described in more detail above with reference to FIGS. 1-2, radio networks 102 may subscribe to a common, centralized management service provided by management system 200. In other configurations, radio networks 102 may subscribe to a plurality of management services, resulting in a centralized negotiation service. If system 100 is a centralized environment, method 300 may proceed to step 308. If system 100 is a decentralized environment, method 300 may proceed to step 316.

At step 308, method 300 may order radio networks 102 according to a predetermined order. Depending on the desired configuration of management system 200, this may be done in a variety of ways. For example, radio networks 102 may be ordered based on radio access technology (e.g. WLAN first because of the potential contiguous channel assignment requirement), load requirement (e.g., heavily loaded first), a round robin fashion, and/or any suitable ordering criteria. In some configurations, the ordering may not relate directly to a characteristic of a given network. For example, management system 200 may order radio networks 102 according to a DSATUR-type algorithm. In this example, the graph-coloring algorithm establishes the order in which networks must be colored and which colors (i.e. noninterfering frequencies) to assign. At each iteration of the algorithm, the network with a higher saturation degree (i.e. the node with a larger number of colored neighbors in the interference graph) is selected to be colored. If more than one node has the same saturation degree, the one with the highest ordinary degree (i.e. the node with larger number of neighbors) is selected. If the draw persists, then a random selection may be performed. The color assigned to the selected network is the lowest channel not being used on any of its neighbors. This type of may be also modified, for example, to color networks based on 802.11 first and then based on their saturation degree. After ordering radio networks 102, method 300 may proceed to step 310.

At step 310, method 300 may determine whether radio networks 102 of system 100 are commonly subscribed to the same management system. As described in more detail above with reference to FIGS. 1-2, radio networks 102 may be commonly subscribed to the same management system. If radio networks are commonly subscribed, method 300 may proceed to step 314. If they are not, method 300 may proceed to step 312.

At step 314, method 300 may assign channels of the shared spectrum to the plurality of radio networks 102. In some embodiments, the total available spectrum may be divided into slices of bandwidth w. For example, this channel slice bandwidth may correspond to a subcarrier bandwidth (e.g., in an Orthogonal Frequency-Division Multiple Access ("OFDMA") network) or 180 kHz corresponding to one Long Term Evolution ("LTE") resource block. In some embodiments, channel slicing engine 208 may be configured to analyze the optimized bandwidth for data indicating that a channel should only be used for a portion of the time required (e.g., when the result of the linear programming problem described in more detail above results in non-integer solutions) and to assign channels accordingly. For the purposes of illustration, ChannelSet={all channel slices} and ChannelSlicesAllocated$_u$ may be the set of channel slices allocated to network u. The list of available channel slices for u may then be defined as ActiveChannelSet$_u$=ChannelSet−{ChannelSlicesAllocated$_j$ ∀j∈N(u) and j<u}. In some embodiments, this ActiveChannelSet$_u$ may include a full slice or a fraction of a slice shared in time between two neighbor networks. A ReuseSet$_u$ may also be defined as the union over all channel slices allocated to the networks that may re-use the shared spectrum are reusable and neighbors to network u: ReuseSet$_u$=∪$_{k \text{ reusePair of } u}$ ChannelSlicesAllocated$_k$.

The following pseudo-code illustrates an example method for determining the channel assignment. Although this example is used, other methods may be understood by one of ordinary skill in the art without departing from the scope of the present disclosure.

```
1:   order the networks (e.g. based on their load, random ordering, etc.)
2:   for u = 1:N
```

-continued $$\text{for } b_u = 1{:}n_u = \text{ceiling}\left(\frac{B_u}{w}\right)$$

assign the slice with the best score from the slices in the set
    ActiveChannelSet$_u$ ∩ ReuseSet$_u$ (including time sharing)
      if Cardinality (ActiveChannelSet$_u$ ∩ ReuseSet$_u$) < n$_u$,
      continue to assign the slices from the set
      ActiveChannelSet$_u$ until the B$_u$ bandwidth is allocated
      to the network u (including time sharing)
  end
  update the ActiveChannelSet$_{u+1}$
  update the ReuseSet$_{u+1}$
end In some embodiments, the score associated with each channel slice may be a function of one or more characteristics of the slice including: channel quality (e.g., higher score for a better channel signal-to-noise ratio), frequency range (e.g., higher score for being at the lower portion of the frequency band), and/or contiguity (e.g., higher score for contiguous channel slices). For example, channel slices allocated based solely on a channel quality score may result in the use of non-contiguous channels, potentially leading to fragmentation of the carrier components.

In order to be consistent with standard specifications that support carrier aggregation, each channel slice should not be smaller than the minimum carrier component supported. For example, if all radio networks 102 operate based on LTE technology, the channel slice should be at least 1.4 MHZ (the minimum carrier component supported in LTE). Networks with different access technologies could also access the band. For example, the current IEEE 802.11 WLAN standard (e.g. 802.11af for extending WLAN over TVWS bands) supports channelization of at least 5 MHZ. As such, channel slices of 5 MHZ bandwidth are required to support non-contiguous carrier aggregation. In urban areas with limited number of white spaces this requirement leads to inefficient/unfair usage of the spectrum.

For example, to increase the fairness and better utilize available spectrum, more finely granular channel slices may be desirable. In order to enable smaller channel slice bandwidth, the bandwidth allocated to each WLAN access point may be smaller than the nominal channel bandwidths specified by the IEEE 802.11 standard (e.g., 5, 10, and 20 MHZ channelization and/or their aggregate combinations). However, in order to avoid large peak-average power ratios ("PAPR") with an OFDM signal (thus requiring expensive amplifiers), contiguous channel slices may be preferable. Thus, for a heterogeneous network setting with mixed LTE and WLAN technologies sharing the same channel, the channel slices can be as small as 1.4 MHZ given that contiguous channel slices are assigned to WLAN. For the setting where multiple WLANs (from different operators) share the channel, the channel slice could be as small as one subcarrier length, taking into account the same contiguous channel assignment requirement.

Although, one example method of implementing coexistence management, through bandwidth allocation and channel assignment, has been illustrated through FORMULAS 1-5 above and their accompanying text, one of ordinary skill in the art would recognize that other methods may be used without departing from the scope of the present disclosure. For example, as described in more detail above, some configurations of management system 200 may assign channels in a manner such that one channel does not carry data for an entire time segment ("time-sharing"). However, some configurations of system 100 may not be readily adaptable to time-sharing. For example, if radio networks 102 are operated by different operators, and/or implement different radio access technologies, scheduling and/or synchronization may not be supported. In such configurations, the bandwidth allocation problem described in more detail above with reference to FORMULA 5, may be modified as illustrated below with reference to FORMULA 6.

$$\max_n \sum_{u=1}^{U} n_u \quad\quad\quad\quad \text{FORMULA 6}$$

subject to $n_u \geq \alpha f_u(load_u)S, \forall u$ $$n_u + \sum_{v \in N_R(u)} n_v \leq S, \forall u$$

In the above example, S may be understood to be $$S = \frac{B_{total}}{w},$$

or the total number of slices. In FORMULA 6, $n_u$ may only take an integer value such that an integer number of slices may be assigned to network u, creating a vector n, where n is equal to $[n_1, n_2, \ldots, n_N]$. FORMULA 6 represents an integer linear problem. A linear programming problem. A solution to the relaxed linear programming problem described with respect to FORMULA 4 may provide an upper bound on the integer linear programming problem described with respect to FORMULA 6. FORMULA 6 may then be solved using branch-and-bound, and/or other numerical techniques.

After assigning the channels, method 300 may return to step 302 to begin the process again.

Referring again to step 310, if all radio networks 102 are not commonly subscribed, method 300 may proceed to step 312. At step 312, method 300 may undergo negotiations between or among the plurality of management systems 200 managing the plurality of radio networks 102. Negotiations may include messaging between or among the plurality of management systems 200. For example, since networks were ordered at step 308, an "Ordering" message that notifies the order of networks for channel assignment when multiple management servers are involved may be required. For example, this may be included e.g. in the "NegotiationInformation" exchanged between management systems 200 in the IEEE 802.19.1 standard, As a further example, a next step in channel assignment may be to make sure that no duplicate channel slice has been allocated to the neighbor networks. As such, management system 200 may be configured to notify other management systems 200 of the list of channels that have already allocated so that the other entity calculates the activeChannelSet (described in more detail below with reference to FIG. 5) for the networks subscribed to it. The ReuseSet (described in more detail below with reference to step 314) for these radio networks 102 may then be determined. For example, the message exchange for the list of allocated channels corresponding to each radio network 102 under management of each management system 200 may be carried in "NegotiationInformation" signal through e.g. "ListofSupportedFrequncies" (along with, in some embodiments, a minimum channel slice bandwidth parameter) or similar data type in the 802.19.1 standard. After concluding the negotiations, method 300 may proceed to step 314.

Referring again to step 306, if method 300 determines that system 100 is a decentralized environment, method 300 may proceed to step 316. At step 316, method 300 may have each radio network 102 select appropriate channel slices, as described in more detail below with reference to FIG. 4. Once slices are selected, method 300 may inform management system 300 of the changes, as described in more detail below with reference to FIG. 4. Once management system 200 has been informed, method 300 may proceed to step 320.

At step 320, method 300 may update data associated with a given radio network 102, as described in more detail below with reference to FIG. 4. Once this data is updated, method 300 may proceed to step 322. At step 322, method 300 may determine whether more radio networks 102 should be analyzed. If so, method 300 may return to step 316. If not, method 300 may return to step 302 to begin the process again.

In some embodiments, the steps of method 300 may be performed by some or all of the components of system 100, as described in more detail above with reference to FIGS. 1-2 and below with reference to FIGS. 4-5. For example, in some configurations, neighbor detection engine 210 may be responsible for gathering and reporting data on neighboring radio networks 102. In other configurations, these steps may be performed by different components of system 100 without departing from the scope of the present disclosure.

Although FIG. 3 discloses a particular number of steps to be taken with respect to method 300, method 300 may be executed with more or fewer steps than those depicted in FIG. 3. For example, in some embodiments, the channel assignment described in more detail above with reference to step 314 may be iterative process for which negotiation may be revisited as the channel assignment for each radio network 102 is instituted. In addition, although FIG. 3 discloses a certain order of steps comprising method 300, the steps comprising method 300 may be completed in any suitable order. For example, in the embodiment of method 300 shown, the determination of whether system 100 is a centralized environment is done prior to the channel assignment and after bandwidth allocation. However, in some configurations, the determination of environment may be done prior to any other steps being performed.

Figure 4:
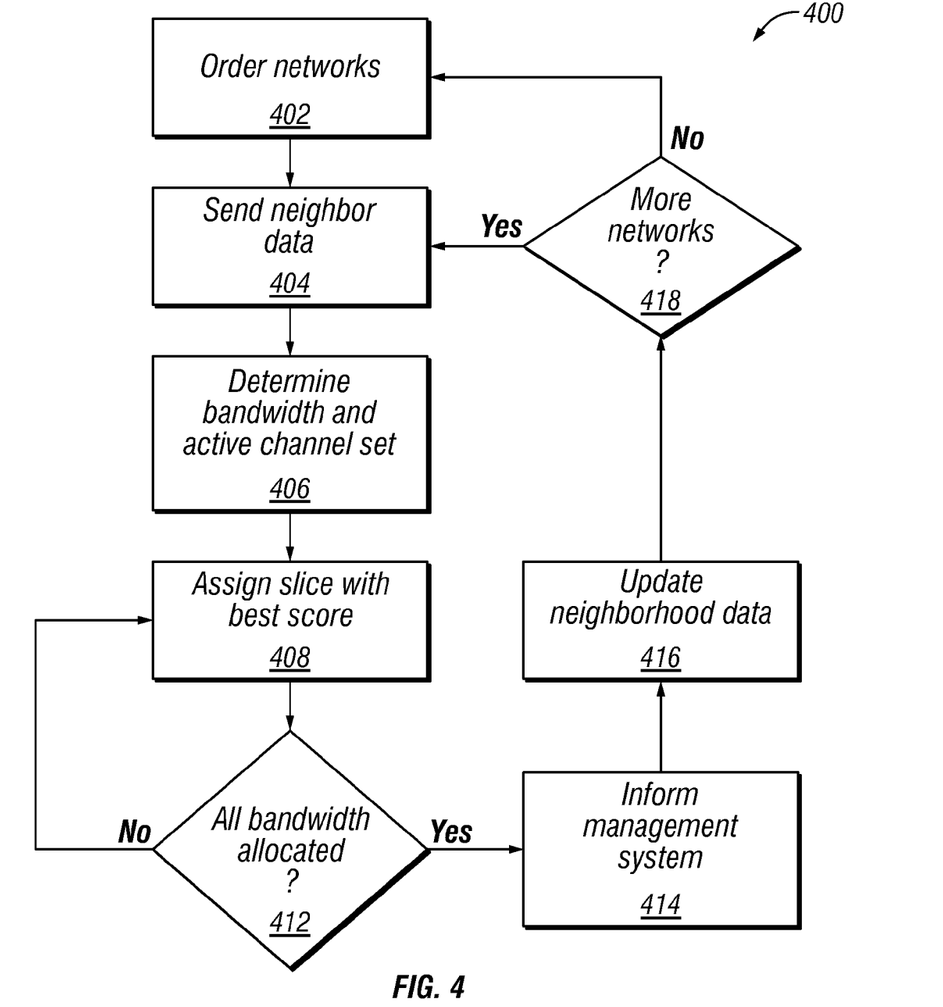
FIG. 4 illustrates a flowchart of an example method for a sequential, distributed channel assignment for a decentralized radio network system, in accordance with certain embodiments of the present disclosure.

FIG. 4 illustrates a flowchart of an example method 400 for a sequential, distributed channel assignment for a decentralized radio network system, in accordance with certain embodiments of the present disclosure. FIG. 4 includes ordering networks, sending neighbor data, determining bandwidth and active channel sets, assigning scores to slices, checking the bandwidth requirements, and informing the management system of the updated data.

According to one embodiment, method 400 preferably begins at step 402. Teachings of the present disclosure may be implemented in a variety of configurations. As such, the preferred initialization point for method 400 and the order of steps 402-416 comprising method 300 may depend on the implementation chosen. Generally, the steps of method 400 may correspond to steps 316-322 of method 300, as described in more detail above with reference to FIG. 3.

At step 402, method 400 may order the various radio networks 102, as described in more detail above with reference to FIGS. 1-3. After order the networks, method 400 may proceed to step 404. At step 404, method 400 may communicate data associated with the neighborhood of radio networks 102 to each radio network 102 in the ordered manner. In some embodiments, this data may include a list of interfering networks, their operating parameters, bandwidth sharing index value, minimum channel slice bandwidth, reuse set, etc. After sending this data, method 400 may proceed to step 406.

In some decentralized environments, for example, management system 200 may provide a report (e.g., a "central service report" or "CXReport") on the interfering networks, as described in more detail above with reference to FIGS. 1-3. This report may contain data associated with the networks' operating frequencies, access technology, interference level, etc. In some embodiments, the report may also include a recommended bandwidth value and/or a bandwidth sharing index, obtained from spectrum analysis engine 206, as described in more detail above with reference to FIG. 3. This data may be used as an indication of how much bandwidth may be fair for each radio network 102 to use.

At step 406, method 400 may determine the optimal bandwidth and the active channel set. For example, using bandwidth factors received from management system 200, each radio network 102 may determine how much bandwidth it can use that leads to an efficient usage of the channel and potentially not to interfere with neighbor radio networks 102. Without the bandwidth information from management system 200, each radio network 102 may locally determine the bandwidth for its operation—e.g. relevant to its load—and may incorporate the knowledge about its neighbor radio networks 102. Each radio network 102 may make a decision on the operating parameters and send data back to management system 200. For example, each radio network 102 may select the set of channel slices that minimizes an interference cost or have the best channel quality (e.g., a greedy algorithm). Such greedy distributed channel assignment could potentially result in interference between two neighbor radio networks 102. In order to avoid this problem, for the next unit of time, when CXReport is updated, each radio network 102 may receive data associated with its performance that may lead to a better decision making (e.g., via reinforcement learning) and may converge to an "orthogonal" channel assignment.

After determining the optimal bandwidth and active channel set, method 400 may proceed to step 408. At step 408, method 400 may begin assigning the slices with the best score from the slices in the active channel set. Channel scores are described in more detail above with reference to FIGS. 1-3. In some embodiments, slices with the best score may be those from the set ActiveChannelSet$_u$ ∩ReuseSet$_u$, as described in more detail above with reference to FIGS. 1-3. As a result, these may be the first assigned. In some embodiments, method 400 may also include selecting a channel slice bandwidth as part of the channel assignment process. For example, using slice bandwidth factors received from management system 200, each radio network 102 may determine an appropriate channel slice bandwidth. For example, slice bandwidth data may be received as part of a report from management system 200 (e.g., a CXReport). As another example, channel slice bandwidth may be assumed to be a minimum carrier component supported by neighbor radio networks 108, as described in more detail above with reference to FIG. 3.

Once a slice with the best score has been assigned, method 400 may proceed to step 412. At step 412, method 400 may determine whether all of the bandwidth $B_u$ has been allocated to network u. If it has, then method 400 may proceed to step 414. If it has not, method 400 may return to step 408. If more slices are needed to fulfill the bandwidth requirement, method 400 may select additional slices until the bandwidth requirement is met.

Referring again to step 412, if all bandwidth has been allocated, method 400 may proceed to step 414.

At step 414, method 400 may inform management system 200 of the slices selected before proceeding to step 416. At step 416, method 400 may update the data associated with the neighborhood of radio networks 102 before proceeding to step 416. At step 416, method 400 may determine whether additional radio networks 102 require updated neighborhood data. In some embodiments, method 400 may send the updated data associated with the neighborhood of radio networks 102 to the next radio network 102 in the order of radio networks 102. The data may subsequently be passed among a set of radio networks 102. If more networks require the neighborhood data, method 400 may return to step 404. If no more networks require the neighborhood data, method 400 may return to step 402.

Although FIG. 4 discloses a particular number of steps to be taken with respect to method 400, method 400 may be executed with more or fewer steps than those depicted in FIG. 4. In addition, although FIG. 4 discloses a certain order of steps comprising method 400, the steps comprising method 400 may be completed in any suitable order. For example, in the embodiment of method 400 shown, the determination of whether system 100 is a centralized environment is done prior to the channel assignment and after bandwidth allocation. However, in some configurations, the determination of environment may be done prior to any other steps being performed.

Figure 5:
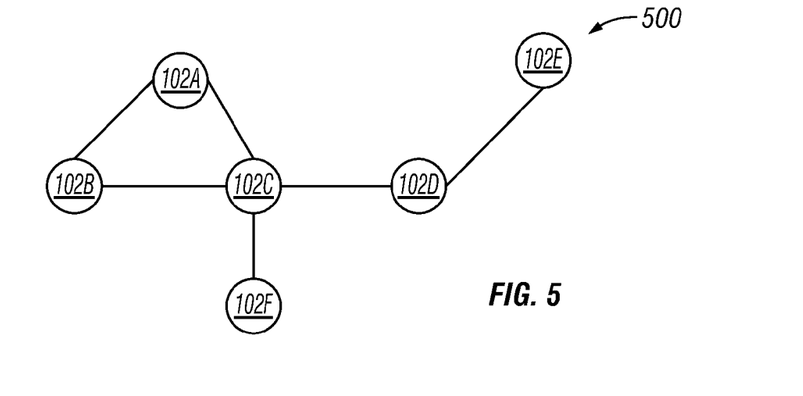
FIG. 5 illustrates an example graph representing an example system including a plurality of radio networks, in accordance with certain embodiments of the present disclosure.

FIG. 5 illustrates an example graph 500 representing an example system 100 including a plurality of radio networks 102, in accordance with certain embodiments of the present disclosure. FIG. 5 is provided as an illustrative example of coexistence management in order to aid in understanding. It should not be understood to limit the scope of the present disclosure.

Graph 500 includes a plurality of radio networks 102. In the example graph 500, system 100 includes six radio networks 102, denoted 102A-102F. The lines between each of the nodes on the graph indicate whether the two nodes connected by such line are potentially interfering with one another. For example, radio networks 102A and 102B are potentially interfering, while radio networks 102A and 102E are not.

Applying the methodology described in more detail above with reference to FIGS. 1-4, a set of networks interfering with each radio network 102 may be establish. Additionally, a neighbor reuse subset may also be determined for each of radio network 102. For example, these sets are listed below for each of the example radio networks 102A-102F, wherein the subscripts for each correspond to the letter denoting the particular radio network 102.

| | |
|---|---|
| N(A) = {2, 3} | Ñ(A) = Ø |
| N(B) = {1, 3} | Ñ(B) = Ø |
| N(C) = {1, 2, 4, 6} | Ñ(C) = {4, 6} |
| N(D) = {3, 5} | Ñ(D) = {5} |
| N(E) = {4} | Ñ(E) = Ø |
| N(F) = {3} | Ñ(F) = Ø |

As described in more detail above with reference to FIGS. 1-4, this may allow a determination of the set of reuse pairs. From radio network 102C, it may be determined that the set of reuse pairs are (4,1), (4,2), (6,1), and (6,2). Likewise, from radio network 102D, the set may be expanded to include (5,3).

The set of reuse pairs may then be applied to a bandwidth optimization problem, as described in more detail above with reference to FIGS. 1-4. For example, this may maximize the spectrum utilization, constrained by a fairness factor described in more detail above with reference to FIGS. 1-4, as well as constrained by total bandwidth allocated to a network and its neighbors that do not belong to the reuse subset.

Beginning with the maximization problem, the above-identified reuse subset, and an assumed $B_{total}$ of 6 MHz, the bandwidth for each radio network 102A-102F may determined in this example to be:

| | | |
|---|---|---|
| $B_A = 2$ | $B_B = 2$ | $B_C = 2$ |
| $B_D = 3$ | $B_E = 3$ | $B_F = 4$ |

In the case of radio networks 102D, 102E, the total bandwidth at those nodes is greater than 6 MHz, and the allocated bandwidth is therefore constrained. Totaling these numbers together gives a total bandwidth value of 16, allow a spectrum reuse value of 16/6. One of ordinary skill in the art may appreciate that this reuse value is an improvement over some prior solutions.

Turning next to the channel allocation problem, and assuming six slices of 1 MHz each (denoted as a, b, c, d, e, and f), graph 500 may provide an example of slicing among radio networks 102A-102F. In the below example calculations, the ActiveChannelSet described in more detail above with reference to FIGS. 1-4 may be denoted as $A_u$, wherein the "u" denotes the particular radio network 102 referenced. Likewise, the ReuseSet described in more detail above with reference to FIGS. 1-4 may be denoted as $R_u$, and the ChannelSlicesAllocated described in more detail above with reference to FIGS. 1-4 may be denoted as $C_u$. In the example provided, radio networks 102A-102F have been ordered as follows: 102A, 102B, 102D, 102C, 102E, 102F.

102A: $A_A=\{a,b,c,d,e,f\} \Rightarrow C_A=\{a,b\}$
$R_A=\emptyset$
102B: AB=$\{c,d,e,f\} \Rightarrow C_B=\{c,d\}$
$R_B=\emptyset$
102D: AD=$\{a,b,c,d,e,f\} \Rightarrow C_D=\{a,b,c\}$
$R_D=\{a,b,c,d\}$
102C: $A_C=\{e,f\} \Rightarrow C_C=\{e,f\}$
$R_C=\emptyset$
102E: $A_E=\{d,e,f\} \Rightarrow C_E=\{d,e,f\}$
$R_E=\{e,f\}$
102F: $A_F=\{a,b,c,d\} \Rightarrow C_F=\{a,b,c,d\}$

What is claimed:

1. A management system for managing coexistence between a plurality of radio networks configured to operate over a shared spectrum, the management system comprising:
   a processor;
   a neighbor detection engine communicatively coupled to the processor, the neighbor detection engine configured to gather a plurality of data about each of the plurality of radio networks;
   a load analysis engine communicatively coupled to the processor, the load analysis engine configured to determine a load level associated with each of the plurality of radio networks;
   a spectrum analysis engine communicatively coupled to the processor, the spectrum analysis engine configured to determine a bandwidth allocation value, the bandwidth allocation value based at least on the load level; and
   a channel slicing engine communicatively coupled to the processor, the channel slicing engine configured to allocate a plurality of channel slices among the plurality of radio networks based on a score associated with each of the plurality of channel slices, wherein the score is based on at least a channel quality, a frequency range, or a contiguity.

2. The system of claim 1, wherein the channel slicing engine is further configured to negotiate a management responsibility with a second management system.

3. The system of claim 2, wherein the channel slicing engine is further configured to negotiate the management responsibility by communicating at least an ordered list of the plurality of radio networks, a list of channel slices available, and a list of channel slices in a neighbor reuse set.

4. The system of claim 1, wherein the spectrum analysis engine is further configured to identify a neighbor reuse subset, the neighbor reuse subset comprising a one or more of the plurality of channel slices capable of re-use.

5. The system of claim 4, wherein bandwidth allocation value is constrained at least by a total bandwidth allocated to a subset of the plurality of channel slices, wherein the subset comprises channel slices that are not members of the neighbor reuse subset.

6. The system of claim 1, wherein the channel slicing engine is configured to allocate the plurality of channel slices among the plurality of radio networks by allocating a channel slice of the plurality of channel slices based on time-sharing.

7. The system of claim 1, wherein the management system is compatible with an IEEE 802.19.1 standard.

8. A system for managing coexistence between a plurality of radio networks configured to operate over a shared spectrum, the system comprising:
a management system comprising:
a processor;
a neighbor detection engine communicatively coupled to the processor, the neighbor detection engine configured to gather a plurality of data associated with each of the plurality of radio networks;
a load analysis engine communicatively coupled to the processor, the load analysis engine configured to determine a load level associated with each of the plurality of radio networks;
a spectrum analysis engine communicatively coupled to the processor, the spectrum analysis engine configured to determine a bandwidth allocation value, the bandwidth allocation value based at least on the load level; and
a radio network being one of the plurality of radio networks, the radio network configured to:
receive the plurality of data associated with each of the plurality of radio networks;
receive the bandwidth allocation value; and
allocate a plurality of channel slices associated with the radio network based on a score associated with each of the plurality of channel slices, wherein the score is based on at least a channel quality, a frequency range, or a contiguity.

9. The system of claim 8, wherein the radio network is further configured to communicate a plurality of data associated with the allocation of the plurality of channel slices to the management system.

10. The system of claim 8, wherein the channel slicing engine is further configured to negotiate a management responsibility with a second management system.

11. The system of claim 10, wherein the channel slicing engine is further configured to negotiate the management responsibility by communicating at least an ordered list of the plurality of radio networks, a list of channel slices available, and a list of channel slices in a neighbor reuse set.

12. The system of claim 8, wherein the radio networks are further configured to identify a neighbor reuse subset, the neighbor reuse subset comprising a one or more of the plurality of channel slices capable of re-use.

13. The system of claim 12, wherein bandwidth allocation value is constrained at least by a total bandwidth allocated to a subset of the plurality of channel slices, wherein the subset comprises channel slices that are not members of the neighbor reuse subset.

14. The system of claim 8, wherein the management system is compatible with an IEEE 802.19.1 standard.

15. A method for managing coexistence between a plurality of radio networks configured to operate over a shared spectrum, the method comprising:
gathering a plurality of data about each of the plurality of radio networks;
determining a load level associated with each of the plurality of radio networks;
determining a bandwidth allocation value, the bandwidth allocation value based at least on the load level; and
allocating a plurality of channel slices among the plurality of radio networks based on a score associated with each of the plurality of channel slices, wherein the score is based on at least a channel quality, a frequency range, or a contiguity.

16. The method of claim 15, further comprising negotiating a management responsibility with a second management system.

17. The method of claim 16, wherein negotiating the management responsibility comprises communicating at least an ordered list of the plurality of radio networks, a list of channel slices available, and a list of channel slices in a neighbor reuse set.

18. The method of claim 15, further comprising identifying a neighbor reuse subset, the neighbor reuse subset comprising a one or more of the plurality of channel slices capable of re-use.

19. The method of claim 18, wherein bandwidth allocation value is constrained at least by a total bandwidth allocated to a subset of the plurality of channel slices, wherein the subset comprises channel slices that are not members of the neighbor reuse subset.

20. The method of claim 15, wherein allocating the plurality of channel slices among the plurality of radio networks comprises allocating a channel slice of the plurality of channel slices based on time-sharing.

21. The method of claim 15, wherein the method is compatible with an IEEE 802.19.1 standard.

* * * * *